No. 821,913. PATENTED MAY 29, 1906.
F. G. WILSON.
FLY TRAP.
APPLICATION FILED JUNE 15, 1905.

Witnesses
C Edwin Lewis.
E Anna Talbot

Inventor
F. G. Wilson.
by J. Shepherd Harker Attorneys

UNITED STATES PATENT OFFICE.

FRANK G. WILSON, OF PLATTE, MICHIGAN.

FLY-TRAP.

No. 821,913.  Specification of Letters Patent.  Patented May 29, 1906.

Application filed June 15, 1905. Serial No. 265,338.

*To all whom it may concern:*

Be it known that I, FRANK G. WILSON, a citizen of the United States, residing at Platte, in the county of Benzie and State of Michigan, have invented certain new and useful Improvements in Fly-Traps, of which the following is a specification.

My invention relates to fly-traps, and has for its object to provide a trap from which the flies may be easily and quickly removed.

With this and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
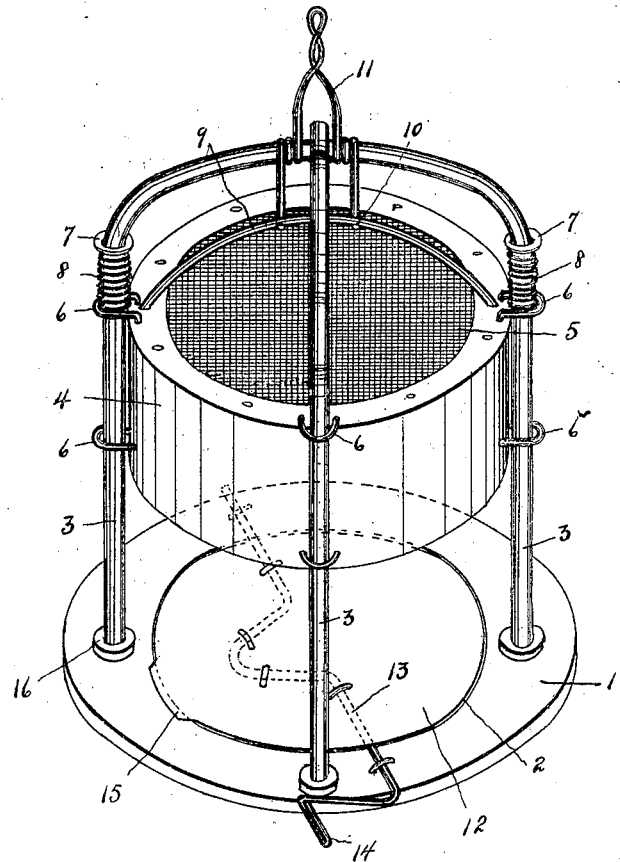
Figure 2:

In the drawings, Figure 1 is a perspective view of my improved fly-trap. Fig. 2 is a side view of the catch which holds the drum in an elevated position.

Referring to the drawings, in which like numerals of reference indicate corresponding parts throughout both views, 1 is a circular base provided with an opening 2. Secured to said base are guides 3, between which drum 4 is vertically movable. The drum is constructed of sheet-metal sides and a screened top 5, the bottom of said drum being open. Loops 6 encircle the guides 3 and have their ends secured to the drum. Fixed to two of the guides are collars 7, against which the upper ends of coiled springs 8 press. The lower ends of said springs exert a downward pressure on the upper loops 6 of their respective guides.

A bail 9 is secured to the drum by which it is raised and held in an elevated position by the hooks 10 on the pivoted catch 11. The opening 2 in the base is adapted to be closed by a plate 12, which is pivoted thereto by wire 13, which has one end bent to form a crank 14, said crank lying in a substantially horizontal plane on the same side of the pivot as the projection 15 of the plate. The wire 13 has its central portion bent substantially V-shaped, said bent portion being secured to the plate on the same side of the pivot as crank 14. By this construction it will be seen that one side of the plate will be heavier than the other by reason of the crank and the bent central portion of the pivot-wire being on the same side of said pivot. This will cause that side of the plate to swing downward, said downward movement being limited to a horizontal position of the plate by reason of the projection 15 thereon coming in contact with the base 1. Leather washers 16 encircle the sides and operate to hold the drum a little above the base, thereby providing a slight opening through which the paper holding the bait may be drawn before killing the flies. This opening also serves as an entrance for the flies to the interior of the drum when the top is used as an ordinary trap.

The operation of my device is as follows: The drum 4 is raised against the stress of springs 8, and the hooks 10 are swung under the bail. The paper holding the fly-bait is placed upon plate 12, which, as before described, lies in a horizontal position. The drum is lowered or sprung by means of catch 11 until it rests on washer 16. When a sufficient number of flies are within the trap, the device is placed over an uncovered hole on a stove, and crank 14 is turned until plate 12 is in a vertical position. The heat from the stove will quickly kill the flies in the trap, and they will fall into the fire. The trap is then ready to be reset.

Having thus described my invention, what I claim as novel, and desire to secure by Letters Patent, is—

In a fly-trap, the combination of a base having an opening therethrough, a shaft extending transversely of said opening, a closure for said opening mounted for tilting movement upon the said shaft, vertical guides secured to the said base an open-bottom cage vertically movable on said guides and a trigger adapted to hold the cage in an elevated position.

In testimony whereof I affix my signature in presence of two witnesses.

FRANK G. WILSON.

Witnesses:
  KATIE WORTHINGTON,
  VICTOR LYBERG.